US008842493B2

(12) United States Patent
Almaas et al.

(10) Patent No.: US 8,842,493 B2
(45) Date of Patent: Sep. 23, 2014

(54) METHOD FOR OFFSET TIMING OF SIMULTANEOUS SEISMIC SOURCE FIRING

(75) Inventors: Jan Almaas, Lierskogen (NO); Stig Solheim, Oesteraas (NO); Johan Hauan, Oslo (NO); Tor A. Ommundsen, Blommenholm (NO); Kjell Saeten, Asker (NO)

(73) Assignee: WesternGeco L.L.C., Houston, TX (US)

( * ) Notice: Subject to any disclaimer, the term of this patent is extended or adjusted under 35 U.S.C. 154(b) by 551 days.

(21) Appl. No.: 12/896,521

(22) Filed: Oct. 1, 2010

(65) Prior Publication Data
US 2012/0081998 A1 Apr. 5, 2012

(51) Int. Cl.
*G01V 1/38* (2006.01)
(52) U.S. Cl.
CPC .................................. *G01V 1/3861* (2013.01)
USPC ............................................ 367/23; 181/111
(58) Field of Classification Search
USPC ................... 367/23, 55; 181/107, 111
See application file for complete search history.

(56) References Cited

U.S. PATENT DOCUMENTS

| 3,687,218 | A | * | 8/1972 | Ritter ............................... 367/23 |
| 3,893,539 | A | * | 7/1975 | Mott-Smith .................. 181/115 |
| 4,733,747 | A | * | 3/1988 | McCormack ................. 181/107 |
| 4,757,482 | A | * | 7/1988 | Fiske, Jr. ....................... 367/144 |
| 5,650,981 | A | | 7/1997 | Jacobsen et al. |
| 6,545,944 | B2 | | 4/2003 | de Kok |
| 6,704,245 | B2 | | 3/2004 | Becquey |
| 6,882,938 | B2 | | 4/2005 | Vaage et al. |
| 6,906,981 | B2 | | 6/2005 | Vaage |
| 2009/0097357 | A1 | | 4/2009 | Robertsson et al. |
| 2009/0310439 | A1 | | 12/2009 | Hauan et al. |
| 2010/0008184 | A1 | * | 1/2010 | Hegna et al. .................... 367/21 |

OTHER PUBLICATIONS

International Search Report and Written Opinion of PCT Application PCT/US2011/052098 dated Apr. 23, 2012: pp. 1-10.

* cited by examiner

*Primary Examiner* — Ian J Lobo

(57) ABSTRACT

A technique enables measuring of the actual firing sequence times in a seismic survey application. The actual firing sequence times are then employed in simultaneous source resolution methods. For example, simultaneous seismic sources may be deployed in a survey region. The seismic sources are then fired, and the actual firing times are determined and recorded for use in optimizing the seismic survey.

18 Claims, 3 Drawing Sheets

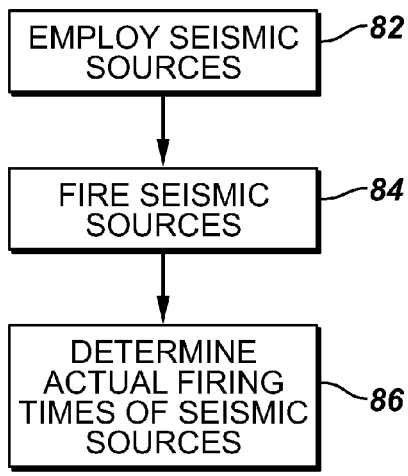
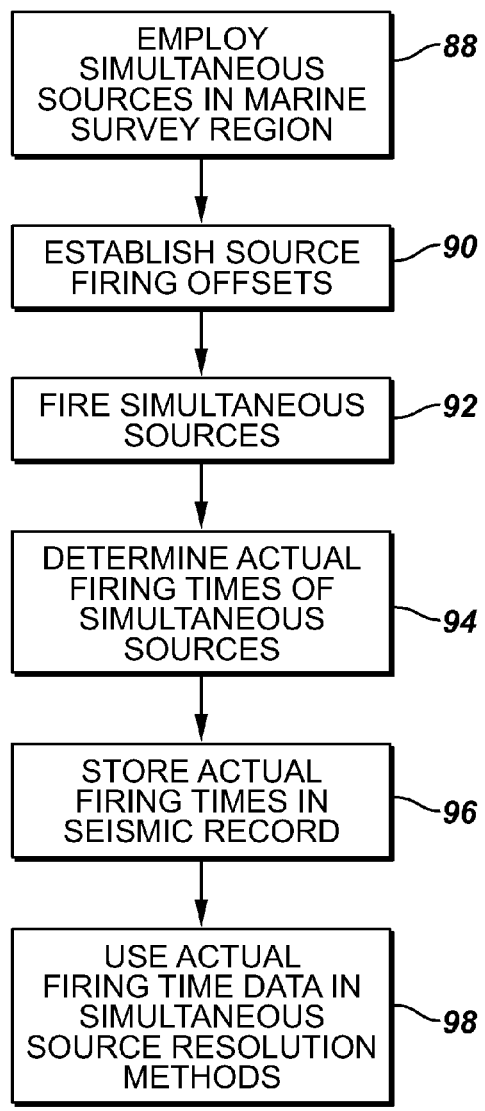

METHOD FOR OFFSET TIMING OF SIMULTANEOUS SEISMIC SOURCE FIRING

BACKGROUND

In a variety of environments, seismic surveys are performed to gain a better understanding of subterranean geological formations. In marine environments, for example, seismic surveys are conducted to improve the understanding of geological formations located beneath a body of water. In seismic survey applications, seismic sources are employed to create pulses of energy, and data on the energy from the seismic sources is recorded. The recorded information is used to improve the quality of the seismic survey by, for example, optimizing signal resolution.

When employing simultaneous source methods of seismic acquisition, various techniques are employed to establish source firing offsets, often called source sequences. These offsets in time may then be used to find, resolve, and/or separate any of the simultaneous sources from other coherent and incoherent noise sources in the seismic records. The offsets may either be systematic or pseudo-random. Both approaches are actually deterministic in that the methodology is designed with respect to the systematic approach and constrained with respect to the pseudo-random approach. The approaches are employed to optimize methods of signal resolution; however errors or inaccuracies may result from the systematic and/or pseudo-random approaches.

SUMMARY

In general, the present invention provides a methodology for measuring the actual firing sequence times which are then employed in simultaneous source resolution methods. For example, simultaneous seismic sources may be deployed in a survey region. The seismic sources are then fired, and the actual firing times are determined and recorded for use in a simultaneous source resolution regime designed to enable optimization of a seismic survey operation.

BRIEF DESCRIPTION OF THE DRAWINGS

Certain embodiments of the invention will hereafter be described with reference to the accompanying drawings, wherein like reference numerals denote like elements, and:

FIG. 5 is a flowchart illustrating one example of a methodology used to improve a seismic survey operation, according to an embodiment of the present invention; and FIG. 6 is a flowchart illustrating another example of a methodology used to improve a seismic survey operation, according to an embodiment of the present invention.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for improving the quality of seismic surveys. A plurality of seismic sources is used for generating seismic signals which propagate into the earth. The seismic signals may be generated in both land and marine environments for reflection by subsurface seismic reflectors. The reflected signals are recorded by seismic detectors which may be disposed along a surface of the sea in marine applications or along a land surface in land applications. The recorded data is processed to obtain useful information related to subsurface characteristics that can aid in the search for oil and gas deposits.

To improve the methods for finding any particular seismic source in a seismic record, the present methodology determines the actual firing times of the seismic sources instead of using the planned systematic or pseudo-random firing times. According to one embodiment of the present invention, the actual firing times are determined and subsequently employed in simultaneous source resolution methods. By using the actual firing times, the source firing offsets in time can be used to more accurately find, resolve, and/or separate any one of the simultaneous sources from the other coherent and incoherent noise sources in the seismic records. In other words, the source signal separation methods are improved by using the actual seismic source firing time offsets rather than the planned offsets.

Determining the actual seismic source firing offsets, as described below, may be achieved with a timing algorithm that measures gun firing closure using a precision clock combined with an accounting for system transmission delays. Time differences between planned source firing events and the actual realization of those events are recorded along with the timing residuals. The recorded data may then be made available to a variety of simultaneous source separation methods to improve the signal-to-noise ratio of resolved individual source signals.

Figure 1:
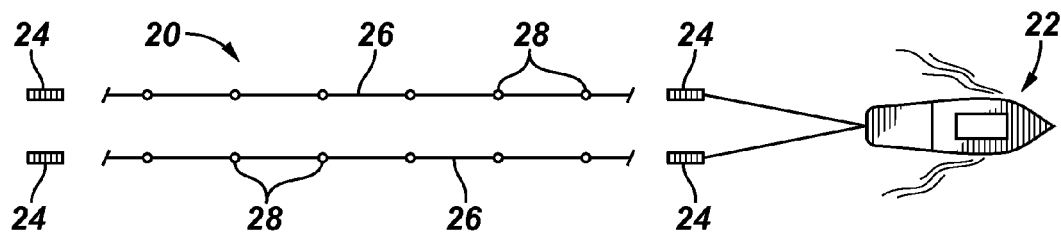
FIG. 1 is a schematic view of a seismic vessel pulling a plurality of seismic sources in a marine survey area, according to an embodiment of the present invention.

Referring generally to FIG. 1, a general seismic survey system 20 is illustrated to show one example of a method for acquiring seismic data. In this example, seismic system 20 is a marine system, although land based systems also may be utilized to achieve the desired information on subterranean formations. As illustrated, seismic system 20 comprises a tow vessel 22 for towing a plurality of seismic sources 24 which are used as simultaneous sources for generating seismic signals. In the marine application illustrated, sources 24 may comprise guns that can be fired to initiate waves of energy. In some applications, vessel 22 also may be used to tow one or more streamers 26 having a plurality of sensors 28 that are used to detect reflected seismic source signals. In other applications, the streamers 26 may be towed with a separate vessel.

Figure 2:
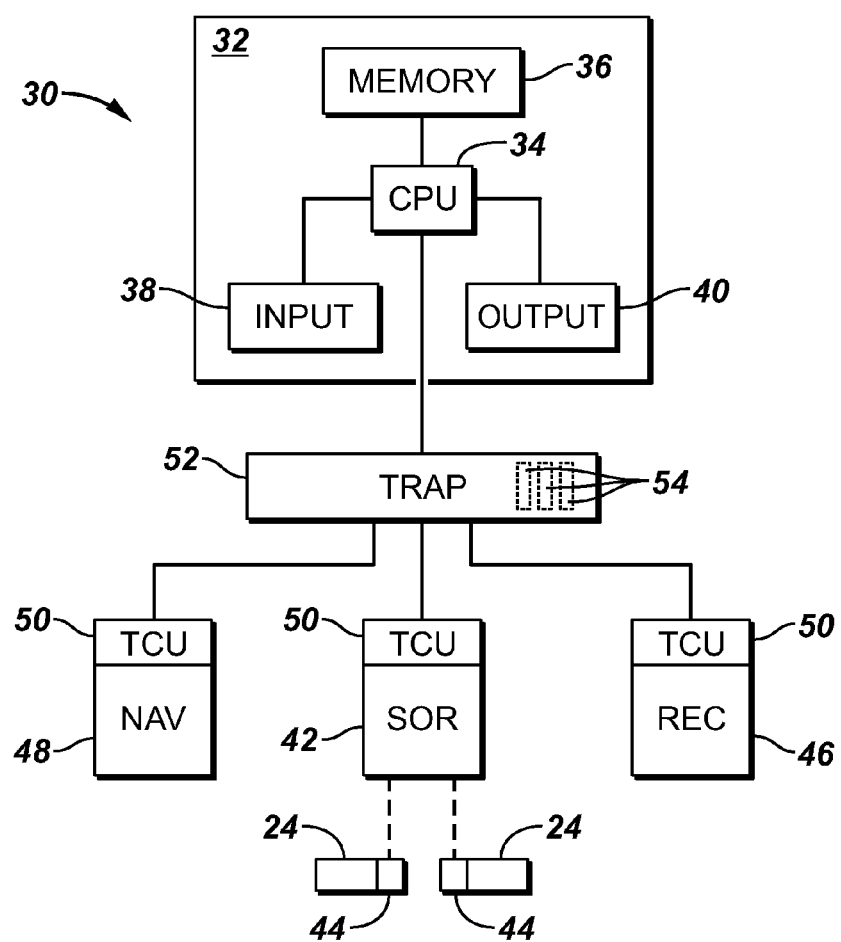
FIG. 2 is a schematic illustration of a system for determining the actual firing sequence times of seismic sources, according to an embodiment of the present invention.

Seismic system 20 also comprises a seismic data acquisition system 30, as illustrated schematically in FIG. 2. Data acquisition system 30 is used to determine and record actual firing times along with other seismic survey data. According to one embodiment, data acquisition system 30 comprises a control system 32 that may be a computer-based system. The control system 32 may be used to automatically calculate actual seismic source firing times, to record those times in the seismic records, and/or to utilize the actual firing sequence times in various simultaneous source resolution methods/algorithms. By way of example, control system 32 is utilized in performing simultaneous source separation methods to improve the signal-to-noise ratio of resolved individual source signals. In many applications, the actual firing times may be employed to optimize the separation of simultaneously recorded sources.

By way of general example, control system 32 comprises a central processing unit (CPU) 34 which is operatively connected to a variety of components used in initiating firing and in detecting, relaying and recording data related to the seismic source firing. CPU 64 also may be coupled with a control system memory 36, an input device 38, and an output device 40. Input device 38 may comprise a variety of devices, such as a keyboard, mouse, voice-recognition unit, touchscreen, other input devices, or combinations of devices. Output device 40 may comprise a visual and/or audio output device, such as a monitor having a graphical user interface. The output device 40 may be used to display to an operator information related to actual firing times and to other parameters related to a given seismic operation. The processing may be accomplished on a single device or multiple devices at the survey region, away from the survey region, or with some devices located at the survey region while others are located remotely. Furthermore, control system 32 may be incorporated partially or wholly into the various other components utilized in data acquisition system 30.

As illustrated, other components of seismic data acquisition system 30 comprise a plurality of modules designed to handle various aspects of the seismic source signal initiation, detection and recording. For example, data acquisition system 30 may comprise a source control module 42 which is designed to provide source firing control and digitization of sensor data for source, e.g. gun, firing times, source depth, and near field signature. As illustrated, each source control module 42 comprises electronics 44 specifically used to provide the source firing control as well as the digitization of sensor data.

Another module of the seismic data acquisition system 30 is the data recording module 46. The data recording module 46 retrieves and stores seismic data as measured by the sensors 28 positioned along streamers 26. The data recording module 46 also stores data from the in-sea digital source system, e.g. data obtained from electronics 44 on source firing time, source depth, near field signature, and other desired data. It should be noted that data recording module 46 may be combined with or used in cooperation with memory 36 of control system 32. In the embodiment illustrated, seismic data acquisition system 30 further comprises a navigation module 48. Navigation module 48 may be used for a variety of services, including navigation, source positioning, data binning, and related quality assessment services.

In the example illustrated, each of the main data acquisition system modules 42, 46, 48 has a time control unit 50. The time control units 50 are connected to a timing relay and pulse box 52 which collects timing data from the data acquisition system modules 42, 46, 48. The timing relay and pulse box 52 comprises timing counters 54 that are stopped upon receiving timing pulse events from the various data acquisition system modules. The specific timing of pulse events received from the modules 42, 46 and/or 48 can be compared relative to each other and relative to planned shot times, i.e. planned seismic source firing times. The control system 32 may be combined with timing relay and pulse box 52 or maintained separately. Additionally, the control system 32 may be utilized to perform a variety of statistical analyses based on the planned and measured data related to firing times. Depending on the specific data acquired, the algorithms/statistical analyses may vary, but the information gathered is readily utilized in determining the actual firing times of sources 24 according to conventional statistical analysis techniques.

Figure 3:
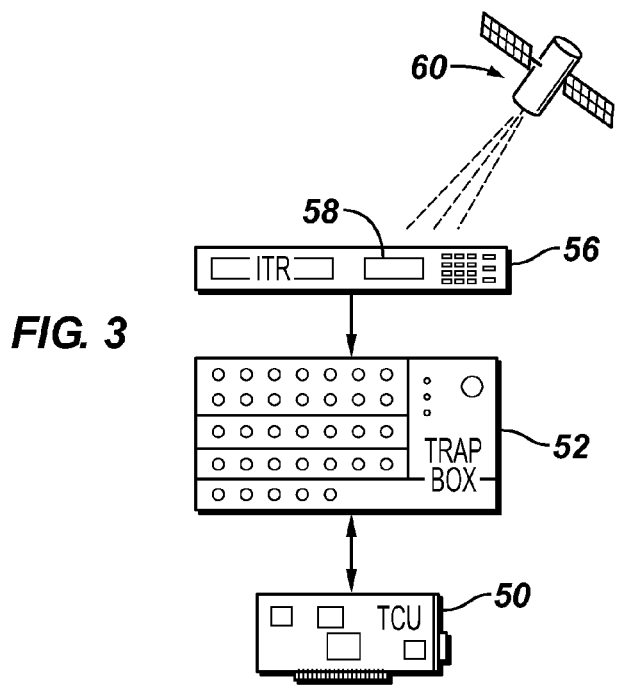
FIG. 3 is a schematic illustration of an embodiment of certain types of components employed to determine actual firing times, according to an embodiment of the present invention.

In the present example, the timing relay and pulse box 52 also is operatively coupled with an integrated timing receiver 56, as illustrated in FIG. 3. The integrated timing receiver 56 runs a high frequency oscillator 58 and is connected to a global positioning system 60. In seismic survey applications described herein, global positioning system 60 may be used to obtain accurate positions and times, which data is then used by, for example, control system 32. Accordingly, the global positioning system 60 is employed to obtain desired data on the timing pulses or other signals related to the firing of simultaneous sources 24 and/or to the detection of reflected seismic energy at sensors 28.

With the integrated timing receiver 56, the high frequency oscillator 58 enables maintenance of accurate timing within microseconds, e.g. less than 30 microseconds, of the global positioning system constellation time. Additionally, the time control units 50 of seismic data acquisition system 30 establish individual clocks for individual data acquisition modules, e.g. modules 42, 46, 48. In this example, the individual clocks are all kept within a few microseconds, e.g. less than 10 microseconds, of the integrated timing receiver time.

Figure 4:
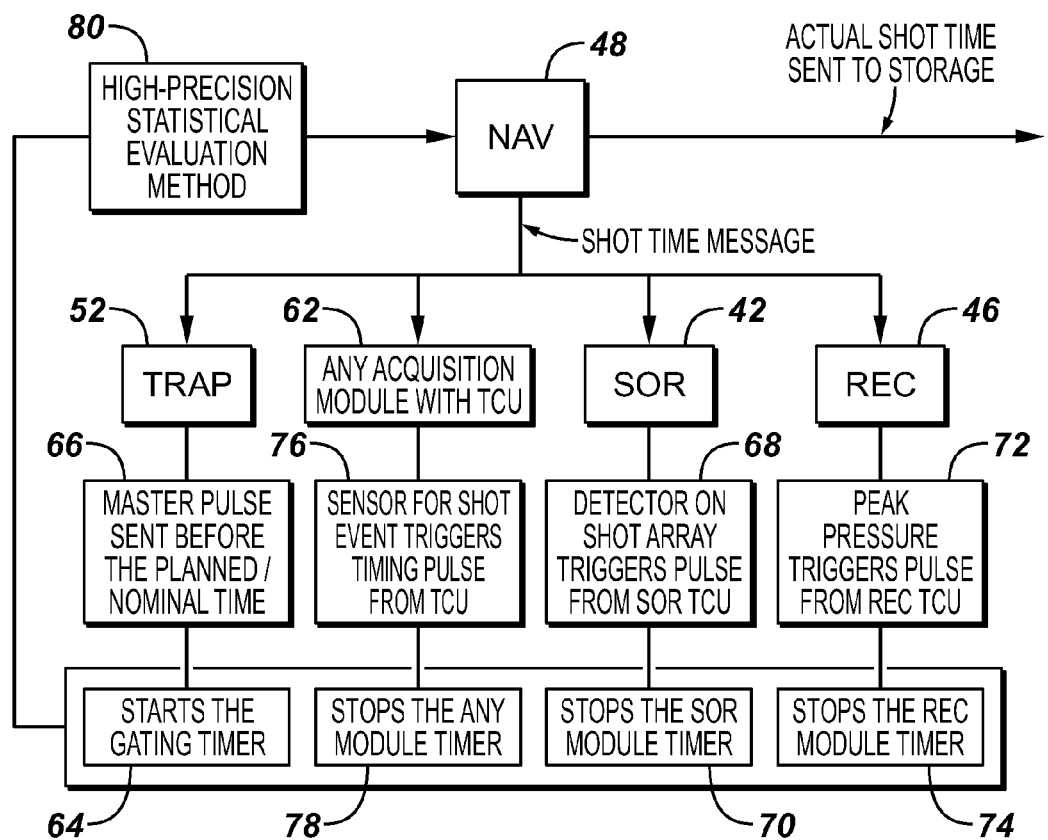
FIG. 4 is schematic illustration showing data flow of timing pulse information, according to an embodiment of the present invention.

Referring generally to FIG. 4, an example is provided to illustrate the data flow of hardware timing pulse information. The accurate collection of the various timing data, e.g. timing pulses, combined with the recorded firing times can be used in a statistical analysis to determine actual firing times. For example, control system 32 may be programmed with available statistical methods to provide a statistical analysis of the data in real-time to accurately determine actual firing times of sources 24.

In the example illustrated in FIG. 4, the navigation module 48 controls and distributes the nominal source firing times to the other subsystems of the seismic data acquisition system 30. For example, the nominal source firing times are distributed to source control module 42 and data recording module 46. However, the nominal source firing times also may be delivered to the timing relay and pulse box 52 and/or to other potential data acquisition modules, as represented by block 62. In this example, the navigation module 48 also causes initiation of a gating timer 64 of the timing relay and pulse box 52 to catch source time pulses from any of the data acquisition system modules that are equipped with a time control unit 50. In one embodiment, the navigation module 48 causes the timing relay and pulse box 52 to initiate gating timer 64 with a master pulse before the planned nominal shot/firing time as represented by block 66.

The firing of seismic sources 24 is controlled by source control module 42. However, after the shot has been fired under control of the source control module 42, the source control module electronics 44 are used to detect the emitted pressure wave. Upon detection of the emitted pressure wave, the electronics 44 (in cooperation with the control unit 50 of source control module 42) send a pulse back to the timing relay and pulse box 52, as represented by block 68. Upon receipt by the timing relay and pulse box 52, the corresponding timing counter 54 is stopped, as represented by block 70.

Additionally, the recording module 46 measures the peak pressure time and sends its own timing pulse back to the timing relay and pulse box 52 via its time control unit 50, as represented by block 72. When the timing pulse from recording module 46 is received by timing relay and pulse box 52, the corresponding timing counter 54 is stopped, as represented by block 74.

If other data acquisition system modules 62 are employed, those modules also send an appropriate timing pulse back to timing relay and pulse box 52 via their timing control units 50, as represented by block 76. Again, receipt of the pulse/ signal causes the corresponding timing counter 54 to immediately stop, as represented by block 78. Consequently, timing relay and pulse box 52 collects a variety of data on both the planned or nominal firing times of sources 24 and on observed events from a plurality of data acquisition system modules, e.g. modules 42, 46, 48, 62. The data collected may be processed on a suitable processor system, such as control system 32, via a suitable algorithm or statistical analysis program selected according to the specific timing data obtained, as represented by block 80. A variety of available, precision statistical evaluation methods may be employed to evaluate the differences between pulse events relative to the planned shot time and relative to each other to determine the actual firing times of sources 24. Regardless of the specific data acquisition system or technique, the actual firing sequence times are determined and employed in the selected simultaneous source resolution regime/method to optimize the seismic survey operation.

In the example illustrated in FIG. 4, the relative times of the pulses from the data acquisition system modules and the recorded firing times may be evaluated in real-time according to the selected precision statistical method. Depending on the adequacy of the clocks in time control units 50, timing relay and pulse box 52, and/or global positioning system 60, the actual firing times may be determined with great accuracy. For example, actual firing times may be determined with an accuracy of plus/minus 100 microseconds. The actual firing times are then stored together with the seismic records in, for example, memory 36. The recorded actual firing times may be retrieved and used to enhance the seismic survey by, for example, optimizing the separation of simultaneously recorded sources.

One example of a general approach to employing the methodology described herein is illustrated in the flowchart of FIG. 5. In this example, seismic sources 24 are initially employed in a desired seismic survey region, such as a marine survey region, as represented by block 82. The simultaneous seismic sources are shot, e.g. fired, to input a seismic energy into the seismic survey region, as represented by block 84. The actual firing times of the seismic sources are then determined to facilitate an improved seismic survey through, for example, optimization of the separation of simultaneously recorded seismic sources, as represented by block 86.

The specific approach used in obtaining and utilizing the actual firing times may vary from one seismic survey application to another. The methodology also may be adjusted to accommodate land based or marine based seismic surveys and to accommodate attributes of the specific environment. In a typical marine environment, for example, simultaneous sources 24 are employed in a marine survey region, as represented by block 88 of the flowchart illustrated in FIG. 6.

Planned source firing offsets are then established for the seismic survey application, as represented by block 90. The simultaneous sources 24 are then fired, as represented by block 92. Subsequently, the actual firing times of the simultaneous sources 24 are determined, as represented by block 94. The actual firing times may be determined according to a selected procedure, such as the procedure described above with reference to FIG. 4. The actual firing times, along with additional survey data, is then stored in a seismic record, as represented by block 96. The stored data on actual firing times is used to improve the survey results. By way of example, the actual firing time data enables substantial improvement in simultaneous source resolution methods, as represented by block 98.

The embodiments discussed above provide examples of systems, components and methodologies that may be used to improve the results of seismic surveys. Depending on the specific application and environment, the arrangement of systems and components may be changed or adjusted to accommodate the characteristics of the application and environment. For example, the number of simultaneous sources 24 may be two or more as desired for a specific application. Additionally, guns or other devices may be used to impart seismic energy into the surrounding environment. Similarly, a variety of sensors and arrangements of sensors 28 may be selected to detect the reflected energy waves.

Additionally, seismic data acquisition system 30 may comprise a variety of control systems, data acquisition modules, timers and other components to facilitate detection, measurement and storage of data related to simultaneous source firing. Furthermore, data may be relayed to the timing relay and pulse box (or other suitable component) via a variety of pulse/signal communication techniques. The overall data acquisition system also may be designed in a variety of ways to utilize the global positioning system for transfer of data in real time.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of performing a seismic survey operation, comprising:
    employing seismic sources in a survey region;
    establishing source firing offsets;
    firing the seismic sources according to the source firing offsets;
    determining the actual firing sequence times of the seismic sources by collecting timing data from a plurality of individual data acquisition modules via a timing relay and pulse box having timing counters;
    storing the actual firing sequence times to supplement a seismic record; and
    employing the actual firing sequence times in a simultaneous source resolution regime to optimize a seismic survey operation.

2. The method as recited in claim 1, wherein employing comprises using the actual firing sequence times to optimize the separation of simultaneously recorded sources.

3. The method as recited in claim 1, wherein firing comprises utilizing a source control module having distributed in-sea electronics located at each source.

4. The method as recited in claim 3, wherein storing comprises storing the actual firing times on a data recording module.

5. The method as recited in claim 4, further comprising utilizing a navigation module to control and distribute a nominal source firing time to the source control module and the data recording module.

6. The method as recited in claim 5, further comprising using a time control unit with each of the source control module, data recording module, and navigation module to establish individual clocks.

7. The method as recited in claim 6, further comprising placing the time control units in communication with a timing relay and pulse box having timing counters which are stopped to establish pulse events relative to each other and to planned firing times of the simultaneous sources.

8. The method as recited in claim 7, further comprising utilizing an integrated timing receiver coupled between the timing relay and pulse box and a global positioning system.

9. A method, comprising:
  using a source control module to control shots at a plurality of seismic sources in a seismic source array;
  detecting pressure waves emitted from the plurality of sources;
  sending timing pulses corresponding to the pressure waves to a timing relay and pulse box;
  employing a data recording module to measure peak pressure times and to send corresponding peak pressure time pulses to the timing relay and pulse box;
  providing the timing relay and pulse box with data on planned firing times of the plurality of seismic sources;
  processing the timing pulses and the data on a processor system; and
  based on the processing of the timing pulses and the data, stopping timing counters in the timing relay and pulse box to determine the timing pulse events for calculating the actual firing times of the plurality of sources.

10. The method as recited in claim 9, further comprising comparing timing pulse events to each other and to planned firing times of the plurality of seismic sources.

11. The method as recited in claim 10, further comprising outputting data on the actual firing times to a display for use by an operator.

12. The method as recited in claim 10, further comprising obtaining data related to timing pulse events via a global positioning system and an integrated timing receiver coupled to the timing relay and pulse box.

13. A method of performing a seismic survey operation, comprising:
  employing seismic sources in a survey region;
  obtaining times of pulses, from a plurality of data acquisition system modules, and recorded firing times;
  determining actual firing sequence times by analyzing the times of pulses and the recorded firing times via a timing relay and pulse box having timing counters; and
  employing the actual firing sequence times to find, resolve, and/or separate seismic sources from other coherent and incoherent noise sources in the seismic record to thus optimize a seismic survey operation.

14. The method as recited in claim 13, further comprising recording the actual firing sequence times in a seismic record.

15. The method as recited in claim 14, wherein employing comprises recording the actual firing sequence times to improve simultaneous source resolution.

16. The method as recited in claim 13, further comprising firing the seismic sources at planned source firing offsets.

17. The method as recited in claim 13, wherein determining comprises using a plurality of time control units to provide timing pulse data to a timing relay and pulse box.

18. The method as recited in claim 13, wherein employing comprises using the actual firing sequence times to optimize source firing time offsets.

* * * * *